July 12, 1927.

A. T. PETERSON

AGRICULTURAL IMPLEMENT

Filed Dec. 28, 1926

Inventor
Alfred T. Peterson
By Spear, Middleton, Donaldson, Hall
Attorney

July 12, 1927.
A. T. PETERSON
AGRICULTURAL IMPLEMENT
Filed Dec. 28, 1926
1,635,499
4 Sheets-Sheet 2
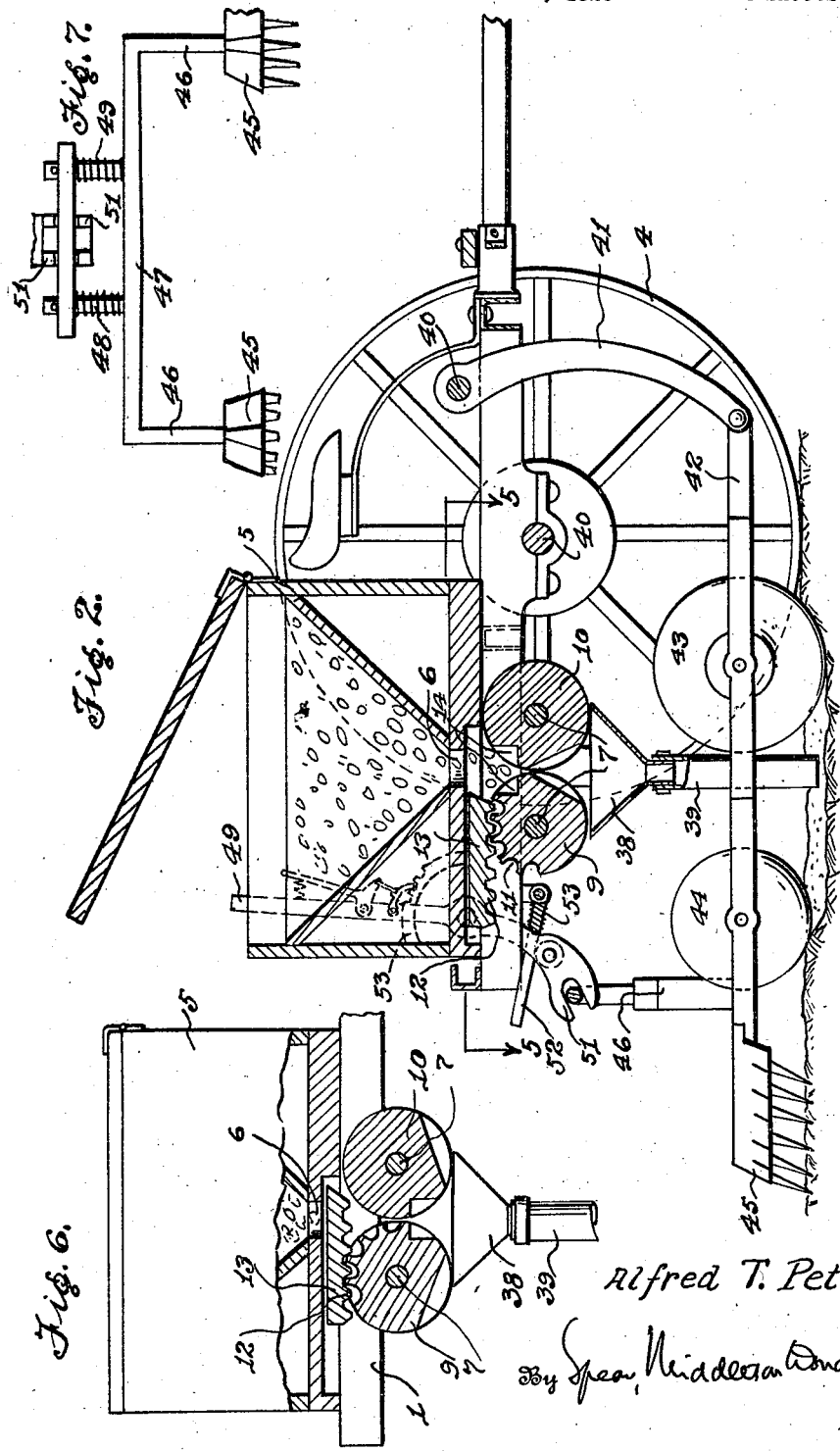
Inventor
Alfred T. Peterson
By Spear, Middleton, Donaldson & Hall
Attorney July 12, 1927.
A. T. PETERSON
1,635,499
AGRICULTURAL IMPLEMENT
Filed Dec. 28, 1926
4 Sheets-Sheet 3
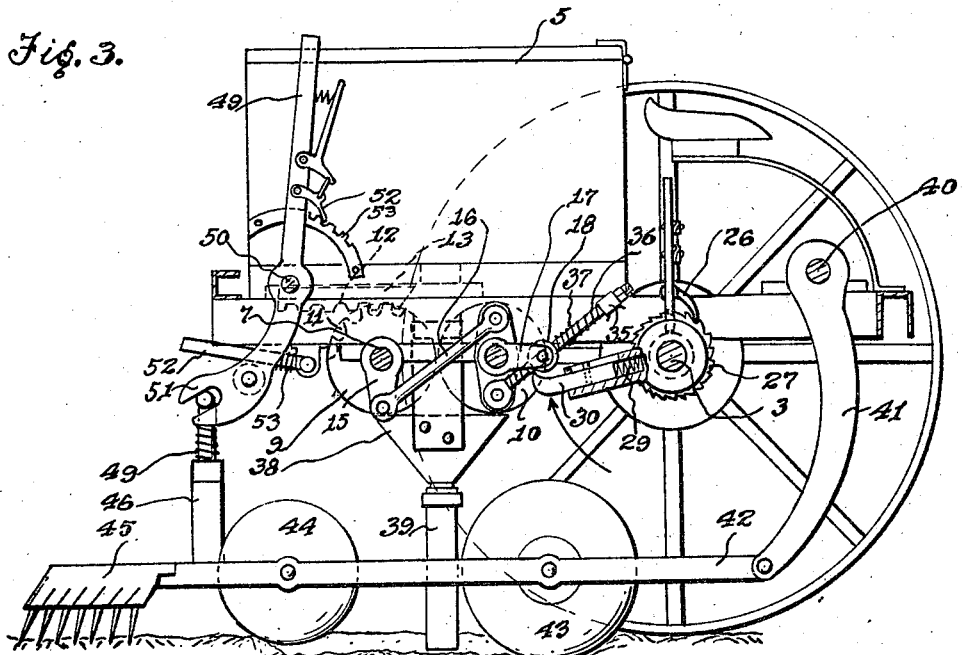
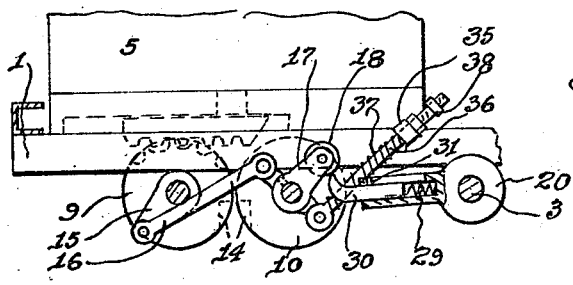
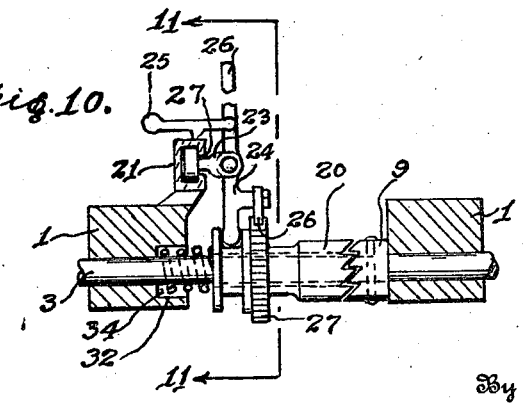
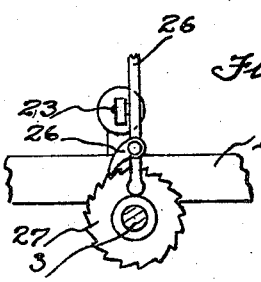
Inventor
Alfred T. Peterson
By Spear, Middleton Donaldson Hoel
Attorney July 12, 1927.

A. T. PETERSON 1,635,499

AGRICULTURAL IMPLEMENT

Filed Dec. 28, 1926

Inventor
Alfred T. Peterson

Attorney

Patented July 12, 1927.

1,635,499

UNITED STATES PATENT OFFICE.

ALFRED THEADORE PETERSON, OF CROOKED RIVERS, SASKATCHEWAN, CANADA, ASSIGNOR OF ONE-TENTH TO GUNNAR CARLSON AND ONE-TENTH TO STEWART W. CARLSON, BOTH OF MINNEAPOLIS, MINNESOTA.

AGRICULTURAL IMPLEMENT.

Application filed December 28, 1926. Serial No. 157,541.

My present invention relates to an agricultural implement of the type used to plant grain such as corn although the device may be readily adapted to plant potatoes or the like.

The principal objects of the invention include the provision of a machine of the type described which will be self-contained, automatic in operation, and which will have an adjustable grain or seed cavity.

Other objects and advantages will appear as the description proceeds.

To this end, the invention includes an implement of the planter type in which the grain, seed or other material to be distributed is placed in a hopper. An automatically operated periodic shut off is provided to intermittently permit the grain to leave the hopper and enter a cavity in the feed rolls. These rolls are mounted beneath the hopper and each is provided with a complimentary cavity so that upon rotation of the rolls the cavity in each will occupy positions contiguous to each other and form a single cavity. At this point, the shut off opens and allows seed or grain to drop into the cavity. Further movement of the machine, closes the shut off, and rotates the feed rolls until the cavity is dumped downward, the material contained therein being received in a funnel or the like which conducts the same into the furrow. Means are provided to adjust the size to which the cavity can open thus regulating the amount of grain it will hold.

The invention further consists in the novel arrangement, combination and construction of parts hereinafter shown and described.

In the drawings:—

Fig. 2 is a sectional elevation along the line 2—2 of Fig. 1.

Fig. 3 is a sectional elevation along the line 3—3 of Fig. 1.

Fig. 6 is an enlarged detail of the hopper and feed rolls showing the latter with cavity dumped.

Fig. 7 is a front detail of the harrow mechanism.

Fig. 9 is a detail of the feed rolls, similar to Fig. 3 showing that mechanism as in dumping the cavity.

Fig. 10 is an enlarged view along the line 10—10 of Fig. 1.

Fig. 11 is a detail along the line 11—11 of Fig. 10.

Figures 1, 8:
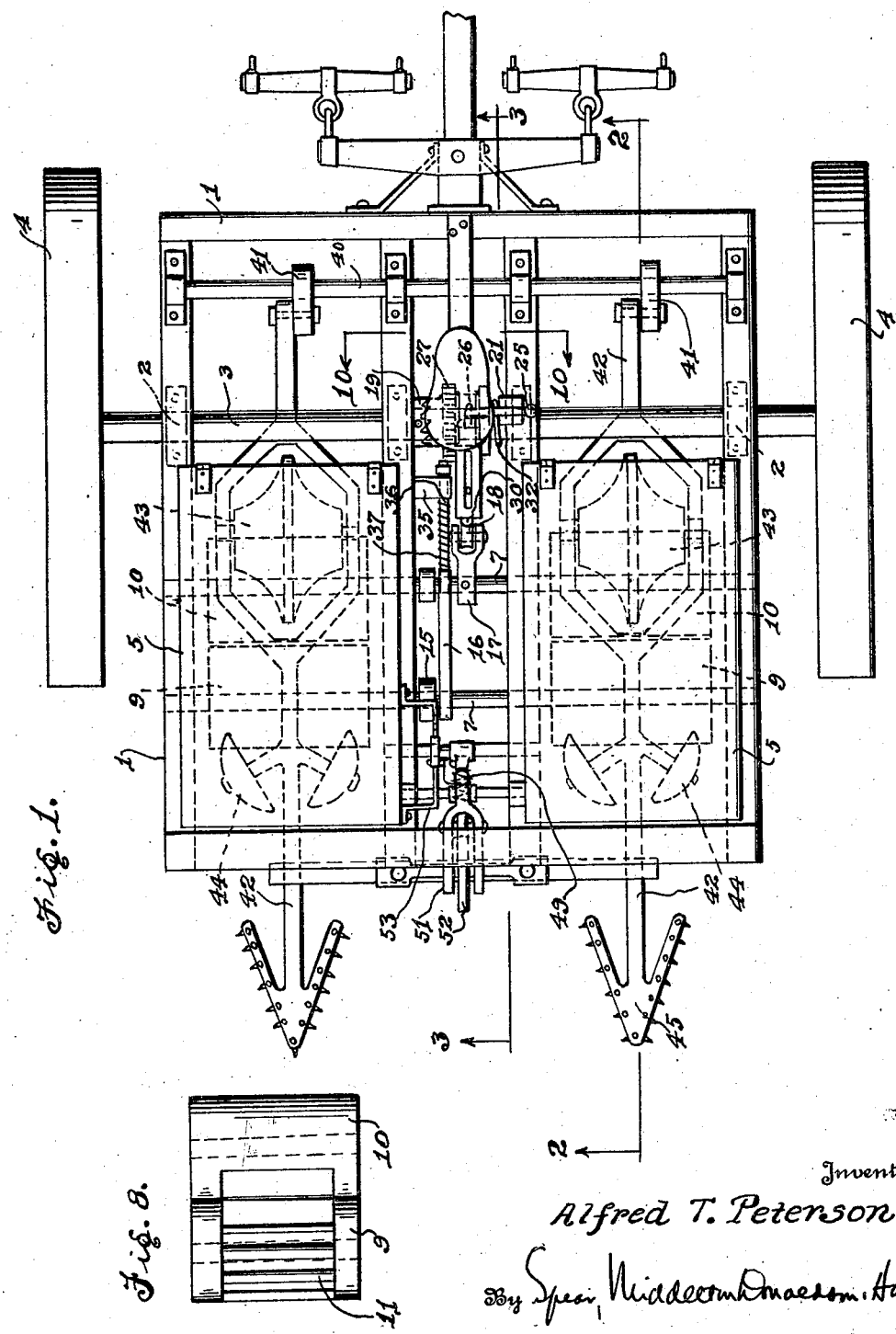
Fig. 1 is a plan view of a machine embodying my invention.
Fig. 8 is a plan view of the feed rolls.
Figure 4:
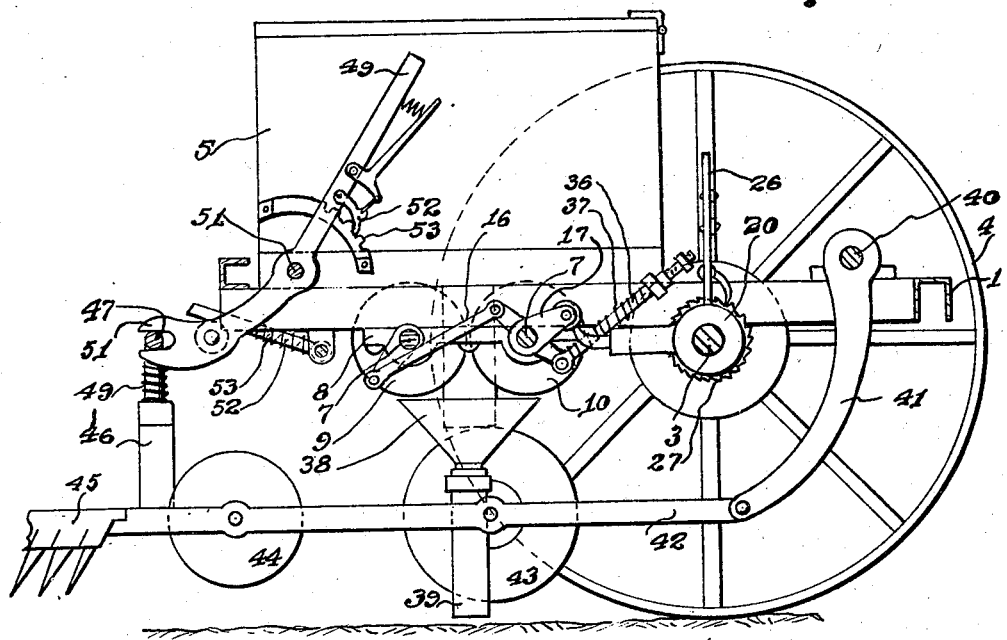
Fig. 4 is a sectional view similar to Fig. 3 showing the plow mechanism in raised position.
Figure 5:
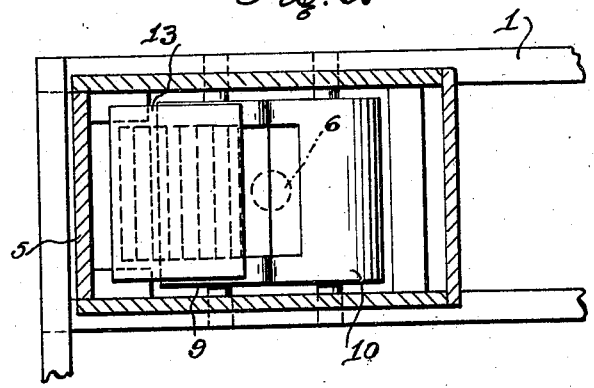
Fig. 5 is a fragmentary plan view partly in section along the line 5—5 of Fig. 2.

Referring now with particularity to the embodiment illustrated, I have shown at 1 a main frame upon which is mounted as upon bearings 2 a drive axle 3 carrying traction wheels 4.

Hoppers 5 are likewise carried upon frame 1, the bottom of the hopper being provided with an apperture 6 through which the material to be planted is dropped.

Mounted below the frame 1, are two rotatable shafts 7, carried in bearings 8. Upon these shafts are mounted feed rolls 9 and 10 respectively. It is to be understood that these feed rolls may be duplicated as many times as desired, two pairs being shown for instance in Fig. 1.

Feed roll 9 is provided with teeth 11 to engage corresponding parts 12 on the under side of a shut off door 13 mounted to slide upon the frame 1 in order to close and open the apperture 6 in the hopper.

Each roll is provided with a cavity 14 to receive the grain or material being planted and these cavities are so placed on the rolls that as the latter are rotated about their shafts, the former will occupy positions adjacent to each other and beneath the hopper aperture to receive the grain where the shut off door is moved to the rear.

The two rolls 9 and 10 are tied together by means of crank arm 15 keyed to one of the shafts 7 connecting the rolls and pitman 16 so that rotation of one will cause similar but opposite rotation of the other.

The shaft carrying roll 10 has pinned thereto a crank arm 17 having bifurcated end carrying a roller 18. Mounted on the main axle 3 I provide a split gear 19 fixed thereto, with which a complementary part 20 is adapted to mesh.

A part 21 having a slot 22 therein is mounted upon the frame 1 and carries therein a slidable fulcrum 23. To this part is pivoted a lever 24 having horizontal and vertical handles 25 and 26. The lower end of the lever 24 engages a peripheral slot in one end of the member 20. To this member 20 is secured a ratchet 27 engaged by a pawl 28. The part 20 (Fig. 9) carries a tubular extension 29 within which is a trip 30 having a hook shaped end, the whole being pressed outward by spring 31.

A coil spring 32 surrounding shaft 3 and seated in a socket 34 in the frame 1 normally causes engagement between the parts 19 and 20 although they may be disengaged by means of the handle 26.

Obviously the trip 30 will rotate as the shaft 3 rotates while parts 19 and 20 are in mesh. As this rotation continues, the hook on trip 30 will engage behind the roller 18 in the crank arm 17 and cause partial rotation of the feed rolls 9 and 10. This action will be repeated every time the shaft 3 rotates.

Obviously more than one trip may be used in order to make use of a larger traction wheel. This has not been illustrated as I consider it merely a duplication of parts.

At the start of operations, the trip 30 may be moved to engage the roller 18 (as in Fig. 3) by movement of the ratchet 27 by means of handle 26. After this, movement of the traction wheels will operate the rolls automatically.

Also secured to the frame 1 is a block 35 (Fig. 9) carrying tension rod 36 secured to roll 10. This rod is surrounded by a coil spring 37 which tends to keep the seed cavities in the rolls up beneath the hopper. Nuts 38 permits any desired adjustment of the tension rod 36. It will thus be seen that the feed rolls are dumped by the trip 30 and returned to receiving position by the spring tension rod 36.

It will be seen that any multiple of hoppers and feed rolls may be used by merely increasing the number of units.

I have found it advantageous to provide directly beneath the feed rolls, a funnel 38 having a flexible conducting tube 39 which directs the seed or grain into the furrow.

I have shown a shaft 40 mounted upon frame 1, carrying depending links 41 connected to a disc and harrow bar 42. This bar carries the plows 43 and cover discs 44 to make and cover the furrow respectively.

A harrow 45 is mounted upon each bar 42 to follow the cover discs 44.

The harrow end of bar 42 has a standard 46, the two standards being tied together by tie rod 47. This last named part is provided with uprights 48 carrying springs 49. The uprights pass through apertures in a connecting rod 50, pins 51 in the tops of uprights 48 preventing accidental withdrawal of the parts.

An operating lever for the disc bar 42 is shown at 49 pivoted to the frame at 50. The lower end thereof is bifurcated as at 51, each arm of this end straddling the connecting rod 50. A spring tension rod 52 is pivoted beneath the frame 1 and passes through an elongated slot in the base of the bifurcated end of the lever 49. A coil spring 53 keeps this end of the lever under tension. At all times this rod will engage and move over roller 54.

When it is desired to lift the plows and harrows out of the ground, the lever 49 is moved forward and held in any desired position by means of the pawl and ratchet mechanism 52 and 53 respectively.

Where it is desired to leave the hopper aperture permanently open and the funnel unobstructed, the rolls may be rotated until their flat sides coincide, the trip disconnected, and in this position, potatoes or the like may be dropped directly through hopper feed rolls and funnel into the furrow without obstruction.

Where thought necessary any type of plows or cultivators may be attached to either the plow bar 42 or to another bar provided for the purpose the object being to make the device as applicable as possible for many uses.

It is to be noted that as shown the circumference of the traction wheels will determine the distance between dumpings of the feed rolls, but as stated above, the same result may be secured by increasing the size of the wheels and increasing the number of trips on the wheel axle.

I claim:

1. An agricultural implement of the type described comprising a frame, an axle mounted upon wheels carried by the frame, a hopper for the distribution of material to be planted, and feed rolls beneath the hopper, with a shut off door slidable beneath the hopper bottom, one of said feed rolls having teeth to engage said door and move the same.

2. An agricultural implement of the type described comprising a frame, an axle mounted upon wheels carried by the frame, a hopper for the distribution of material to be planted, and feed rolls beneath the hopper, said rolls being carried on shafts, with a tension mechanism attached to the frame and one of said shafts, regulating the amount of rotation said feed rolls may have.

In testimony whereof, I affix my signature.

ALFRED THEADORE PETERSON.